United States Patent Office 3,849,413
Patented Nov. 19, 1974

---

3,849,413
PROCESS FOR THE MANUFACTURE OF N-(2,4-DI-HALOGENO-S-TRIAZIN-6-YL)-UREAS
Rainer Begrich, Basel, and Karl Seitz, Oberwil, Basel-Land, Switzerland, assignors to Ciba-Geigy AG, Basel, Switzerland
No Drawing. Filed June 8, 1972, Ser. No. 260,878
Claims priority, application Switzerland, June 22, 1971, 9,102/71; Apr. 25, 1972, 6,100/72
Int. Cl. C07d 55/18
U.S. Cl. 260—249.5                                4 Claims

ABSTRACT OF THE DISCLOSURE

The present invention provides a process for the manufacture of N-(2,4-dihalogeno-s-triazin-6-yl)-ureas, wherein N-(2,4-dihalogeno-s-triazin - 6 - yl)-isocyanates are reacted with ammonia or an aqueous solution of a primary or secondary amine.

---

The present invention relates to a new process for the manufacture of compounds of the formula

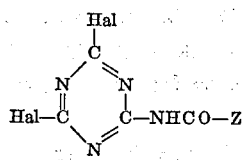

wherein Hal represents a halogen atom, in particular a chlorine atom, and Z is the radical of a primary or secondary amine or is preferably —$NH_2$.

The new compounds according to the invention are manufactured by reacting the corresponding s-triazinyl-isocyanate with water-soluble primary or secondary amines, or preferably with ammonia.

The most expedient method of doing so consists in the dropwise addition of a solution of the isocyanate in an organic solvent, for example benzene, to an aqueous solution of the amine or of ammonia, in the course of which the reactants are used in approximately stoichiometric amounts and the process is advantageously carried out at relatively low temperature, e.g., at 0° C. to 10° C. Despite the presence of water, the reaction takes place virtually quantitatively, i.e., without hydrolysis of the isocyanate and also without the formation of other by-products.

Suitable amines are low molecular aliphatic amines, especially alkylamines whose alkyl radicals contain from 1 to 4 carbon atoms, or cycloaliphatic or heterocyclic amines, such as methylamine, dimethylamine, ethylamine, isopropylamine, t-butylamine, diethylamine, cyclohexylamine, piperidine, pyrrolidine or morpholine.

The isocyanates which are used as starting materials are manufactured most appropriately by reacting aminodihalogenotriazines with oxalic dichloride according to the reaction equation

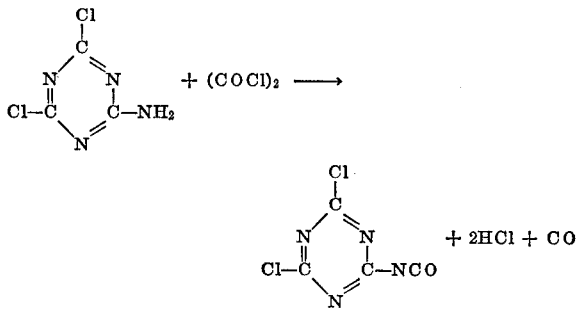

The new products are chiefly suitable as intermediates for the manufacture of fibre-reactive dyes. Reaction with a dye containing an acylatable amino group yields. For example, reactive dyes of the formula

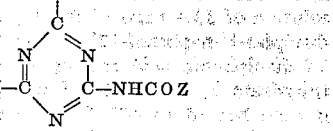

whose distinctive feature is a particularly brisk reactivity, especially with cellulose fibres. In this formula Z has the meaning as hereinbefore.

The following Examples illustrate the invention, the parts and percentages being by weight unless otherwise stated.

EXAMPLE 1

A solution of 95.5 parts of 2,4-dichloro-6-isocyanato-s-triazine in 500 parts of benzene is added dropwise to a solution of 9.0 parts of $NH_3$ in 500 parts of water while stirring vigorously and at 5° C. to 8° C.

The precipitated product is collected by suction filtration, washed with water and dried in vacuo at 50° C. to give 95.7 parts (=92% of the theoretical yield) of a white powder, which slowly decomposes on heating to over 250° C. Elementary analysis gives the following values (the theoretically calculated value for $C_4H_3Cl_2N_5O$ is given in parentheses): C: 23.2 (23.10), N: 33.8 (33.67), Cl: 34.5 (34.09)%.

Digestion with acetone purifies the product from traces of 2,4-dichloro-6-amino-s-triazine.

EXAMPLE 2

A solution of 19.1 parts of 2,4-dichloro-6-isocyanato-s-triazine in 250 parts of toluene is added dropwise to a suspension of 50 parts of toluene in a mixture of 4.8 parts of ethylamine and 300 parts of water while stirring vigorously and at 0–8° C. Stirring is continued for a brief time and the precipitated product is collected by suction filtration. The toluene phase of the filtrate (after drying over $Na_2SO_4$) is evaporated and the residue is combined with the dried filter residue, to give 15.8 parts of N-ethyl-N'-(2,4-dichloro-s-triazin - 6 - yl)-urea which melts at 153–155° C.

The crude product may be purified from any simultaneously occurring N-ethyl-N'-(2-chloro - 4 - ethylamino-s-triazin-6-yl)-urea by recrystallisation from benzene.

Elementary analysis gives the following values (the value calculated for $C_6H_7Cl_2N_5O$ is indicated in parentheses): C: 30.4 (30.53), H: 3.1 (2.99), Cl: 29.8 (30.04)%.

EXAMPLE 3

If in Example 2, 7.8 parts of diethylamine are used instead of ethylamine 18.0 parts of N,N-diethyl-N'-(2,4-dichloro-s-triazine-6-yl)-urea are obtained, which melts at 183–184° C. after recrystallisation from dioxan. Elementary analysis gives the following values (the value calculated for $C_8H_{11}Cl_2N_5O$ is indicated in parentheses): C: 36.2 (36.38), H: 4.4 (4.20), Cl: 26.9 (26.85)%.

EXAMPLE 4

If in Example 2, morpholine (9.2 parts) is used instead of ethylamine, 20.8 parts of a compound of the formula

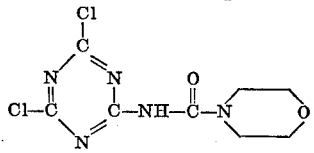

are obtained, which melts at 190–192° C. after recrystallisation from chlorobenzene.

Elementary analysis gives the following values (the value calculates for $C_8H_9Cl_2N_5O_2$ is indicated in parentheses): C: 34.4 (34.55), H: 3.5 (3.26), Cl: 25.9 (25.50)%.

EXAMPLE 5

The intermediate product (9.8 parts) obtained according to Example 1 is suspended hot in 200 parts of tetrahydrofuran. This solution is added all at once to a neutral solution of 33.4 parts of the 1:1 copper complex of 4',8'-disulpho-1'-naphthol-(2'-azo-7-)-1-amino - 8 - naphthol-3,6-disulphonic acid and of 8.6 parts of sodium acetate trihydrate in 300 parts of water. The reaction mixture is then heated to 40° C. until the presence of starting material can no longer be detected (8 to 12 hours). The dyestuff is precipitated by adding 50 parts of sodium chloride, then collected by suction filtration and dried.

The resulting product is a rapidly fixing blue dye of the formula

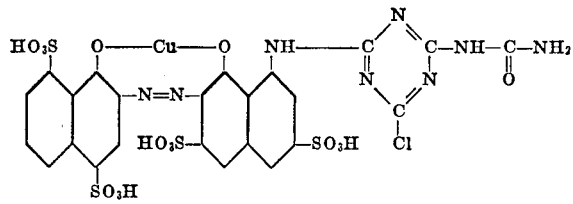

which on cellulose gives dyeings with very good general fastness properties.

Blue dyes with similar properties are also obtained by using an equivalent amount of the intermediates obtained according to Examples 2, 3 or 4.

We claim:

1. A process for the manufacture of a compound of the formula

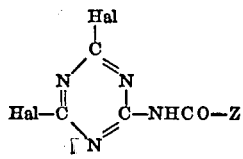

wherein Hal is a halogen atom and Z is —NRR' wherein R and R' are hydrogen, lower alkyl or lower cycloalkyl, or R and R' taken together with the nitrogen atom to which each is bonded is piperidino, pyrrolidino or morpholino, comprising the step of treating a compound of the formula

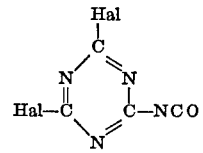

with an aqueous solution of an agent of the formula HNRR'.

2. The process of claim 1, wherein Hal is a chlorine atom.

3. The process of claim 2, wherein the agent is ammonia.

4. The process of claim 1, wherein the treatment is carried out at 0 to 10° C.

References Cited
UNITED STATES PATENTS 3,462,445  8/1969  Muller et al. _____ 260—553 X
3,560,246  2/1971  Payne et al. _____ 260—553 X
3,714,217  1/1973  Sturm et al. _____ 260—553 X

OTHER REFERENCES

Kodama et al.: *Chemical Abstracts*, vol. 64, col. 11231e (1966).

JOHN M. FORD, Primary Examiner

U.S. Cl. X.R.
260—247.2 A